United States Patent [19]

Robinson et al.

[11] Patent Number: 4,759,998

[45] Date of Patent: Jul. 26, 1988

[54] ALKALI METAL SWITCH DEVICE

[75] Inventors: Graham Robinson, Chester; Peter Bindin; John Molyneux, both of Runcorn, all of United Kingdom

[73] Assignee: Chloride Silent Power Limited, Runcorn, United Kingdom

[21] Appl. No.: 10,444

[22] Filed: Feb. 3, 1987

[30] Foreign Application Priority Data

Feb. 10, 1986 [GB] United Kingdom ............... 8603212

[51] Int. Cl.$^4$ ............................................. H01M 2/00
[52] U.S. Cl. ....................................... 429/61; 429/92; 429/104; 429/122
[58] Field of Search .................... 429/61, 104, 62, 90, 429/92, 7, 122, 123

[56] References Cited

U.S. PATENT DOCUMENTS

| | | | |
|---|---|---|---|
| 2,624,033 | 12/1952 | Jacquier | 429/7 X |
| 3,100,862 | 8/1963 | Collier | 429/61 X |
| 4,011,366 | 3/1977 | Bones et al. | 429/61 |
| 4,124,739 | 11/1978 | Sudworth | 429/61 |
| 4,217,400 | 8/1980 | Leffingwell | 429/61 X |
| 4,252,869 | 2/1981 | Heitz et al. | 429/104 X |
| 4,414,297 | 11/1983 | Fischer | 429/61 |

Primary Examiner—Anthony Skapars

Attorney, Agent, or Firm—Finnegan, Henderson, Farabow, Garrett and Dunner

[57] ABSTRACT

Sodium sulphur cells are commonly connected in parallel. It is a problem with such arrangements that if one cell sustains a short circuit failure, the parallel connected cells discharge through it. In an embodiment disclosed, a switch series connected to a cell or series of cells, goes open circuit should current in excess of a predetermined value and consequently associated with the failure of a cell, flow through the switch. The switch comprises a conducting rod separated into two portions and placed within a beta alumina tube containing sodium: the level of the sodium determines whether an electrical circuit is completed between the portions rendering the switch "on". Sodium, contained within an outer conducting tube, also surrounds the inner beta alumina tube, there being an electrical connection from the outer tube, via a resistor, to one portion of the rod. Should a current flow in a direction through the switch corresponding to discharge through a failed series connected cell, the arrangement is such that sodium within the inner tube is at a higher potential than sodium outside the inner tube. Accordingly, sodium cations flow out of the inner tube resulting in the lowering of the sodium level until the switch turns off, thus preventing further discharge through the failed cell.

10 Claims, 1 Drawing Sheet

ALKALI METAL SWITCH DEVICE

BACKGROUND OF THE INVENTION

The present invention is concerned with an alkali metal switch device.

Alkali metal electro chemical cells are known and a particular type which is the subject of much research and development work at the present time is the sodium/sulphur cell. In such cells, sodium metal provides the anode and sulphur/sodium polysulphides provide the cathode. The cell operates at a temperature at which the anode and cathode materials are liquid and the anode and cathode are separated by a solid electrolyte member made of an electronically insulating material which is conductive to sodium cations. A typical electrolyte material is beta alumina. In a fully charged cell, the cathodic material is substantially all sulphur. As the cell discharges, sodium cations migrate through the electrolyte to react with the sodium forming sodium polysulphides. The cell is fully discharged when substantially all sodium has migrated from the anode region or substantially all the sulphur has reacted to a lowest state sodium polysulphide. During recharging of the cell, sodium dissociates from the polysulphides and migrates back through the electrolyte to the anode region.

In order to provide the desired total storage capacity and a desired output voltage, sodium sulphur cells are interconnected in battery networks. If strings of series connected cells are required in the battery to provide the necessary output voltage, it is normal practice to interconnect corresponding cells of the different strings also in parallel, ideally with direct parallel connections between corresponding cells at the same potential in every series string. The need for this series/parallel connection of cells in a battery arises because of the possibility of individual cells becoming open circuit when either fully charged or discharged (or due to certain kinds of damage). If long series connected strings of cells are interconnected in parallel only at the ends of the string, then a single cell of the string becoming open circuit disconnects the entire string from the rest of the battery.

However, the multiple parallel connection of cells from different strings can make the battery more vulnerable if one cell sustains a short circuit failure, whereupon all parallel connected cells in the bank may discharge through the failed cell. As a result, the practice hitherto has been to use strings with several cells in series and interconnect these strings in parallel. The complete battery might then comprise several series connected sets of these parallel connected strings.

U.S. Pat. No. 4,414,297 discloses a shunt element which may be connected in parallel with a single cell in a series connected string of cells in a battery. The shunt element is normally open circuit when there is the usual operating voltage appearing across the cell with which it is connected in parallel. However, if the cell fails, losing its inherent output voltage and becoming a relatively high resistance, the continued flow of discharging current through the failed cell results in a reversal of the potential difference across the failed cell. In response to this opposite potential difference, the shunt device eventually becomes short circuit thereby providing a bypass circuit around the failed cell.

The shunt device comprises two regions containing liquid alkali metal and separated by a cationically conductive electronically insulating membrane. A first region has two current collectors one of which is constantly in contact with alkali metal remaining in the region, and the other of which is only contacted when the alkali metal reaches a predetermined level within the region. The second region has a current collector continuously in contact with alkali metal in the second region. The current collector in the second region is connected directly to the current collector in the first region which is not normally in contact with alkali metal in the first region. The current collector which remains constantly in contact with alkali metal in the first region is connected directly to a positive terminal of a cell to be shunted and the other two current collectors are connected to the negative terminal. Thus, whilst the cell is operative a positive potential is produced between the alkali metal in the first and second regions, tending to drive alkali metal into the second region. In the event of a reversal of polarity due to failure of the cell, alkali metal will be driven from the second region into the first region until the level of metal in the first region brings the metal into contact with the second current collector in the first region. This then produces a short circuit path through the alkali metal in the first region shunting the faulty cell.

It should be noted with the aforementioned prior art shunt element that, once the alkali metal level in the first region has risen to come into contact with the second current collector in the first region, the element then becomes substantially inactive apart from carrying any bypass current shunted round the failed cell. Because the current collector in the second region and the second current collector in the first region are connected directly together, no potential difference can be produced between the alkali metal in the two regions once the alkali metal reaches the level of the second current collector in the first region. As a result, the described element is only useful as a shunting element which can change irreversibly from an open circuit state to a closed circuit state.

Reference may be made also to GB-A-No. 1516638 which illustrates a sodium sulphur cell which incorporates an additional current collector located in the anode region and connected by means of a resistance to the current collector of the cathode region. This additional current collector in the anode region is contacted by alkali metal in the anode region only when the alkali metal reaches a level corresponding to a maximum level of charge of the cell, whereupon a bypass path is provided for further charging current via the resistance. This arrangement is provided to ensure that all cells of a series connected string of cells can reach maximum charge.

BRIEF SUMMARY OF THE INVENTION

According to one aspect of the present invention, an alkali metal switch device comprises first and second regions each containing alkali metal which is liquid at the operating temperature of the device, a cationically conductive electronically insulating membrane separating said first and second regions to be in contact with alkali metal in both regions, the device having a predetermined orientation in which it is to operate and the level of liquid alkali metal in said first region being dependent on the amount of alkali metal contained therein, first and second current collectors in said first region both of which remain in electronic contact with the liquid alkali metal in said first region only when the liquid alkali metal is at or above a predetermined level in said first region, a third current collector in electronic contact with liquid alkali metal in the second region, a first connection terminal electrically connected to the first current collector, a second connection terminal electrically connected to the third current collector and a predetermined resistance interconnecting the second current collector and the second connection terminal.

With such a switch device, a positive current flowing from the second terminal to the first terminal whilst the liquid alkali metal level in the first region is at or above said predetermined level, flows primarily through the predetermined resistance and between the second and first current collectors, thereby producing a potential difference between the alkali metal in the second region and that in the first region tending to drive remaining alkali metal from the second region into the first region.

On the other hand, if a positive current is passed from the first terminal to the second terminal, whilst the alkali metal level in the first region is above the predetermined level, the current flowing through the resistance produces a potential between the alkali metal in the first and second regions tending to drive alkali metal cations from the first region into the second region. As a result the level of alkali metal in the first region progressively declines until it falls below the predetermined level whereupon contact between at least one of the first and second current collectors and the alkali metal is lost thereby breaking the current path through the resistance. If it is the second current collector only which loses contact with the alkali metal, and the first current collector remains in contact, then continued current can flow by means of cationic conduction through the membrane until the alkali metal in the first region is exhausted or falls below a level at which it remains in contact with the first current collector. No further current flow can then take place between the first and second terminals.

If on the other hand it is the first current collector which loses contact with the alkali metal when the level falls below the predetermined level, then the current path from the first to the second connection terminals is immediately lost. In either case, the switch device becomes effectively open circuit between the first and second connection terminals in the event the integrated positive current flowing from the first to the second connection terminal exceeds a predetermined total charge.

Thus, in a preferred application, there is provided a battery of alkali metal cells comprising a plurality of the cells connected in parallel or in parallel connected strings of series connected cells, and including at least one alkali metal switch device of the kind described above, the switch device having in normal operation liquid alkali metal in said first region at or above said predetermined level and being connected by its connection terminals in series with a cell or a string of cells such that a discharge current from the cell or cells flowing through the device via the first and second current collectors in the first region generates a voltage potential across said predetermined resistance which biases the third current collector positively relative to the first and second current collectors. As a result, when a discharge current flows through the alkali metal device, alkali metal is driven from the second region into the first region, maintaining the level of alkali metal in the first region above said predetermined level. However, when a charging current flows through the switching device to the cell or string of cells connected in series therewith, the third current collector becomes negatively biased relative to the first and second current collectors, thereby tending to drive cations of the alkali metal from the first region into the second region. The rate of transfer of cations, and thus the rate of depletion of the alkali metal in the first region, is dependent on the value of the resistance generating the potential difference, and of the charging current flowing through the device. In use, the switching device is designed by appropriate selection of the resistance value and the amount of alkali metal which must be transferred from the first region to the second region before the level in the first region drops below the predetermined level, so that a charging current can continue to flow through the switching device to provide the normal full capacity charge to the series connected cell or cells. However, if the charging current continues excessively long or at an excessively high level so that the total charge becomes substantially in excess of the normal capacity charge of the series connected cell or cells, the alkali metal in the first region will become depleted to below said predetermined level thereby either immediately or shortly thereafter rendering the switch device open circuit.

Accordingly, the series connected switch device can effectively isolate a damaged cell or a string of cells containing a damaged cell when the damage is such as to produce a continuous conduction path through the cell. Typically, cell failure can result from loss of integrity of the solid electrolyte member separating the anode and cathode regions of the cell. Cathodic reactant can then migrate into the anode region resulting in the cell becoming discharged and eventually providing a continuous conduction path across the cell. In the absence of the switch device connected in the battery as described above, such a failed cell when connected in parallel with a number of other cells would result in the other cells discharging through the failed cell. The switch device connected in series with the failed cell would, on the other hand isolate the failed cell once excessive charging current had flowed into the failed cell, so that the remaining parallel connected cells could then continue to provide power in the battery.

The present invention may also be viewed from a different aspect, according to which there is provided a battery of alkali metal cells comprising a plurality of cells connected in parallel or in parallel connected strings of series connected cells, and including a respective switching device connected in series with each cell or string of cells, each said switching device being normally closed to enable charging and discharging current flow through the device to the associated cell or string of cells and being arranged to become open isolating the associated cell or string of cells once a predetermined total charge in excess of the capacity of the associated cell or cells has passed through the switching device in a cell charging direction. The provision of such switching devices in a battery as defined above enables a battery to be made in which substantially every individual cell is connected in parallel with neighbouring cells at the same potential but in each case via a respective switching device. The inclusion of the switching devices then avoids the problem of the entire bank of neighbouring cells becoming discharged through one failed cell of the bank.

Each said switching device may then comprise means generating a bias potential corresponding to charging current flowing to the associated cell or cells, a container of alkali metal which is liquid at the operating temperature, an electronically insulating membrane which is conductive to cations of the alkali metal dividing the container into first and second regions, biasing means applying said bias potential to the liquid alkali metal on opposite sides of the membrane to drive cations of the alkali metal through the membrane from one region to the other in accordance with the applied potential and normally closed contact means carrying said charging and discharging current flow and responsive to the level of liquid alkali metal in said first region to open interrupting said current flow when a predetermined quantity of liquid alkali metal, corresponding to said predetermined total charge, has been transferred through the membrane from one region to the other.

Preferably, said contact means comprise first and second current collectors normally making electronic contact with liquid alkali metal at or above a predetermined level in said first region, said biasing means being arranged to drive cations from said first region to said second region in response to a charging current flow.

Conveniently said means generating a bias potential comprises a resistance in series with said second current collector, to carry said charging and discharging current flow. Then the biasing means may comprise a third current collector in electronic contact with liquid alkali metal in the second region and electrically connected to the side of said resistance opposite to the second current collector.

BRIEF DESCRIPTION OF THE DRAWINGS

Examples of the present invention will now be described with reference to the accompanying drawings in which.

As mentioned previously herein, a battery of sodium sulphur cells can be formed of banks of parallel connected individual cells, several of such banks being connected in series to produce a battery with the desired output voltage. The interconnection of the cells of the battery in parallel provides protection against the effects of a single cell becoming open circuit through either damage or when completely discharged or overcharged. However such a battery is then susceptible if one cell fails to a short circuit or at least to provide a continuous conductive path through the failed cell. Then all other cells connected in parallel with the failed cell may become discharged through the failed cell.

In accordance with an embodiment of the invention, respective switching devices are connected in series with each cell of the battery. The switching devices normally provide a short circuit but in the event of a charging current being delivered to a particular cell in excess of the total charge capacity of the cell, the switching device in series with that cell becomes open circuit thereby removing the failed cell from the battery and preventing cells in parallel therewith becoming discharged.

DETAILED DESCRIPTION

Figure 1:
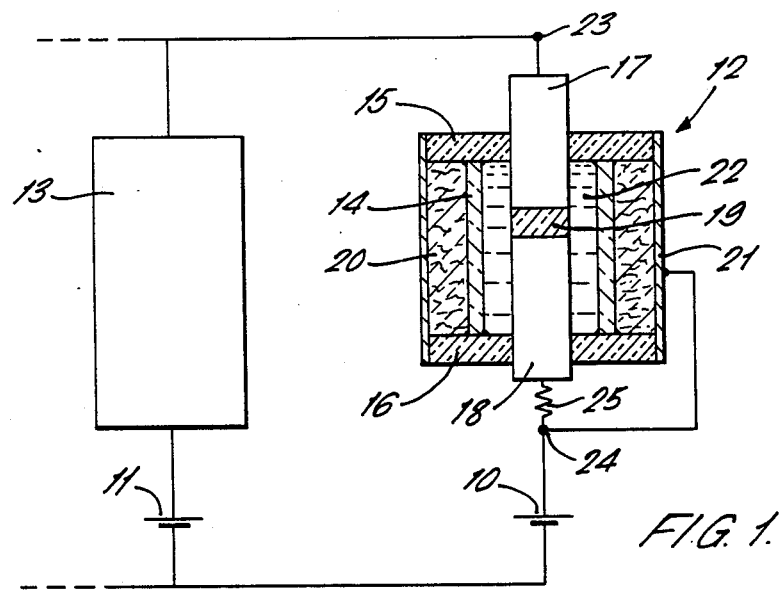
FIG. 1 is a schematic diagram of sodium sulphur cells connected in parallel in a battery, with an alkali metal switching device embodying the present invention connected in series with each cell and illustrated in cross section.

Referring to FIG. 1, a part of a battery is illustrated comprising parallel connected sodium sulphur cells 10 and 11. A respective switching device, 12, 13 is illustrated connected in series with each cell 10, 11.

Each switching device 12, 13 comprises a section of open ended tube 14 made of beta alumina, closed at each end by respective discs 15, 16 of an insulating ceramic material, such as alpha alumina. Conducting rods 17 and 18 are sealed centrally in holes through the discs 15 and 16. As illustrated in the drawing, the rods 17 and 18 may be coaxial with the beta alumina tube 14 but are separated within the tube by a gap 19. The gap 19 may be open or may be filled by an insulating element.

The end discs 15 and 16 are of a diameter greater than the diameter of the tube 14 thereby defining an annular region 20 enclosed by an outer conductive tube 21 which is sealed at each end about the peripheries of the discs 15 and 16.

The annular region 20 contains an electrically conductive porous wicking material, such as carbon felt. The inner region 22 within the beta alumina tube 14 is initially filled with sodium metal up to a level above the gap between the conducting rods 17 and 18 so that there is an electronic short circuit between the rods 17 and 18 through the sodium metal.

It should be appreciated that the switching device 12 is adapted to operate at the normal operating temperature of a sodium sulphur cell or battery, i.e. typically 350° C., at which sodium metal is liquid.

The outer annular region 20 also contains initially a small quantity of sodium impregnated in the porous filling material.

It is important that the inner region 22 and outer annular region 20 are effectively sealed to contain this liquid sodium metal and to withstand the temperature variations which are expected in an operational sodium sulphur battery. Accordingly the beta alumina tube 14 may be sealed to the alpha alumina discs 15 and 16 by glazing. Thermo compression bonding techniques may be employed for sealing the conducting rods 17 and 18 to the holes through the discs 15 and 16,and also for sealing the conductive outer tube 21 around the peripheries of the discs 15 and 16.

The switching device 12 has two terminals 23 and 24. Terminal 23 is electronically connected directly to the upper most conductive rod 17. Terminal 24 is connected directly to the outer conductive tube 21. The lower conductive rod 18 is connected to the terminal 24 via a resistor 25. The resistor 25 will have a typical value of a few milliohms and may in practice be provided by a suitable choice of the dimensions and material construction.

In normal operation, the two rods 17 and 18 are electronically connected together via the liquid sodium metal in the inner region 22. Accordingly, with the lower terminal 24 connected to the positive terminal of its associated sodium sulphur cell 10 and the upper terminal 23 connected in parallel to corresponding terminals of adjacent switching devices 13 in the bank of cells in the battery, a discharging current flowing through the switching device from the cell 10 generates across the resistor 25 a small potential rendering the outer tube 21 slightly positive relative to the conducting rod 18. As a result, cations of any sodium available in the outer annular region 20 are driven through the cationically permeable beta alumina tube 14 into the inner region 22. Thus, during discharging of the cell 10 the level of sodium in the inner region 22 tends to increase or is maintained at a maximum level providing continuous conduction for the discharge current via the sodium between the conducting rods 17 and 18.

However, during recharging of the sodium sulphur cell 10, the charging current flows from terminal 23 to terminal 24 in the opposite direction producing a potential difference across the resistance 25 rendering sodium within the inner region 22 slightly positive relative to the outer annular region 20. As a result, during charging of the cell 10 cations of sodium are driven across the beta alumina tube 14 from the inner region 22 to the outer annular region 20. Then the level of sodium in the inner region 22 gradually falls. If the level falls below the level at which it makes contact with the upper conducting rod 17, the conducting path between the terminals 23 and 24 of the switch is broken and the cell 10 becomes effectively isolated.

The switching device 12 is designed by appropriate selection of the value of the resistor 25 and of the quantity of sodium metal which must migrate through the tube 14 during a charging current to bring the level of sodium in the region 22 down below the end of the rod 17, so that the sodium level in the region 22 remains above the lower end of the rod 17 for an amount of charge delivered to the cell 10 corresponding to the predetermined capacity of the cell. As a result if the cell 10 is functioning properly, the switching device 12 continues to provide a conduction path between the terminals 23 and 24 for successive charging and discharging cycles of the cell 10.

However, in the event there is a failure in the cell 10, this may result in the normal potential difference across the cell disappearing so that cells connected in parallel therewith tend to discharge through the cell 10. This will appear to the switching device 12 as a continuous charging current to the cell 10 which will in due course exceed the normal expected cell capacity and result in the sodium level in the region 22 falling below the end of the conducting rod 17, rendering the switching device 12 open circuit. No further current can then flow to or from the cell 10 which is effectively taken out of circuit.

The dimensions of the switching device 12 may vary widely, according to the size of the cells used in the battery. For a cell of about 10 Ah capacity the beta alumina tube 14 within the switching device may be about 1 cm in diameter and 1 cm in length.

Figure 2:
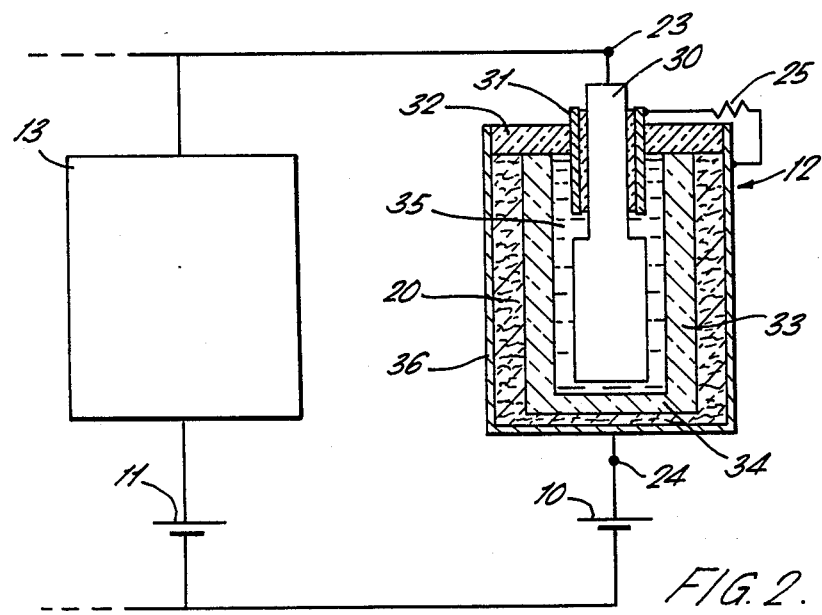
FIG. 2 is a schematic diagram corresponding to that of FIG. 1 and illustrating in cross section a different embodiment of switching device.

Various alternative designs of switching device may be conceived. For example referring to FIG. 2, both of the conducting elements within the inner region containing liquid sodium metal may enter through the upper closure disc. In FIG. 2, a concentric arrangement is shown comprising an inner conducting rod 30, sealed coaxially within an outer conducting cylinder portion 31, the two being sealed in an aperture through a ceramic insulating disc 32. In this arrangement, the beta alumina tube may be formed as a tube 33 with a closed end 34. An upper open end is closed by the alpha alumina disc 32. In the illustrated example, a direct electronic interconnection is provided between the inner conducting rod 30 and the outer cylinder portion 31 via the liquid sodium 35 within the beta alumina tube 34 unless the sodium level within the tube 34 falls below the lower end of the cylinder 31.

As before, the cylinder 31 is connected by means of the resistor 25 to the outer conducting container 36 which is itself connected directly to the terminal 24. The switching device illustrated in FIG. 2 operates in the same way as that described above with reference to FIG. 1. However, with this arrangement, the only seal between a metal conductive member and a ceramic member is that between the outer cylinder 31 and the disc 32. This seal is exposed only to sodium vapour since it is above the upper most level of liquid sodium within the beta electrolyte tube 34. As a result, the reliability of this seal is improved.

It may be desirable for the switching devices to be "fail-safe". This may be assured by arranging for the total volume of sodium in the two regions of the switching device inside and outside the beta alumina tube to be such that in the event of a fracture of the beta alumina tube, the level of sodium remaining inside the tube falls below that necessary to retain contact with both of the electrically conductive members. As a result, in the event of failure of the beta alumina electrolyte in a switching device, the switching device becomes open circuit.

It may further be desirable to use fewer switching devices than sodium sulphur cells in the battery. For example, switching devices may be connected in series with series connected strings of two or more sodium sulphur cells, with only the complete protected string being then connected in parallel in a bank of corresponding strings. Such an arrangement reduces the cost of a battery but also reduces the possible benefits of the protection arrangement in that failure of one cell will remove all other cells in the protected string from service in the battery.

We claim:

1. An alkali metal switch device comprising first and second regions each containing alkali metal which is liquid at the operating temperature of the device, a cationically conductive electronically insulating membrane separating said first and second regions to be in contact with alkali metal in both regions, the device having a predetermined orientation in which it is to operate and the level of liquid alkali metal in said first region being dependent on the amount of alkali metal contained therein, first and second current collectors in said first region both of which remain in electronic contact with the liquid alkali metal in said first region only when the liquid alkali metal is at or above a predetermined level in said first region, a third current collector in electronic contact with liquid alkali metal in the second region, a first connection terminal electrically connected to the first current collector, a second connection terminal electrically connected to the third current collector and a predetermined resistance interconnecting the second current collector and the second connection terminal.

2. A switch device as claimed in claim 1 wherein one of said first and second current collectors remains in electronic contact with the liquid alkali metal in said first region when the liquid alkali metal is below said predetermined level.

3. A switch device as claimed in claim 2 wherein said one of said current collectors is said second current collector.

4. A battery of alkali metal cells comprising a plurality of the cells connected in parallel or in parallel connected strings of series connected cells, and including at least one alkali metal switch device as claimed in Claim 1, the switch device having in normal operation liquid alkali metal in said first region at or above said predetermined level and being connected by its connection terminals in series with a cell or a string of cells such that a discharge current from the cell or cells flowing through the device via the first and second current collectors in the first region generates a voltage potential across said predetermined resistance which biases the third current collector positively relative to the first and second current collectors.

5. A battery as claimed in claim 4, wherein the alkali metal switch device has a predetermined maximum quantity of liquid alkali metal in said first region in excess of the minimum quantity corresponding to said predetermined level, and said predetermined resistance is selected in relation to said maximum excess quantity and the total amount of electrical charge which can be delivered to said cell or string of cells through the device to permit said total charge to be delivered before the liquid alkali metal in the first region falls below said predetermined level.

6. A battery of alkali metal cells comprising a plurality of cells connected in parallel or in parallel connected strings of series connected cells, and including a respective switching device connected in series with each cell or string of cells, each said switching device being normally closed to enable charging and discharging current flow through the device to the associated cell or string of cells and being arranged to become open isolating the associated cell or string of cells once a predetermined total charge in excess of the capacity of the associated cell or cells has passed through the switching device in a cell charging direction.

7. A battery as claimed in claim 6 wherein each said switching device comprises means generating a bias potential corresponding to charging current flowing to the associated cell or cells, a container of alkali metal which is liquid at the operating temperature, an electronically insulating membrane which is conductive to cations of the alkali metal dividing the container into first and second regions, biasing means applying said bias potential to the liquid alkali metal on opposite sides of the membrane to drive cations of the alkali metal through the membrane from one region to the other in accordance with the applied potential and normally closed contact means carrying said charging and discharging current flow and responsive to the level of liquid alkali metal in said first region to open interrupting said current flow when a predetermined quantity of liquid alkali metal, corresponding to said predetermined total charge, has been tranferred through the membrane from one region to the other.

8. A battery as claimed in claim 7 wherein said contact means comprise first and second current collectors normally making electronic contact with liquid alkali metal at or above a predetermined level in said first region, said biasing means being arranged to drive cations from said first region to said second region in response to a charging current flow.

9. A battery as claimed in claim 8 wherein said means generating a bias potential comprises a resistance in series with said second current collector, to carry said charging and discharging current flow.

10. A battery as claimed in claim 9 wherein said biasing means comprises a third current collector in electronic contact with liquid alkali metal in the second region and electrically connected to the side of said resistance opposite to the second current collector.

* * * * *